United States Patent
Broutin et al.

(10) Patent No.: US 6,519,068 B1
(45) Date of Patent: Feb. 11, 2003

(54) CIRCUITS AND METHODS FOR ACHIEVING HIGH SIGNAL-TO-NOISE RATIOS AND OBTAINING STABILIZED LASER SIGNALS IN DENSE WAVELENGTH DIVISION MULTIPLEXING SYSTEMS

(75) Inventors: Scott L. Broutin, Kutztown, PA (US); James Kevin Plourde, Allentown, PA (US); John William Stayt, Jr., Schnecksville, PA (US)

(73) Assignee: Agere Systems Inc., Miami Lakes, FL (US)

( * ) Notice: Subject to any disclaimer, the term of this patent is extended or adjusted under 35 U.S.C. 154(b) by 0 days.

(21) Appl. No.: 09/420,168

(22) Filed: Oct. 18, 1999

(51) Int. Cl.[7] ............................................. H04B 10/04
(52) U.S. Cl. ...................... 359/187; 359/189; 372/29; 372/32; 372/34
(58) Field of Search ................ 359/187, 189, 359/127, 132; 372/29, 32, 34, 28, 38, 20, 33, 9; 250/214 A, 214 R, 214 C, 226, 552

(56) References Cited

U.S. PATENT DOCUMENTS 6,088,142 A * 7/2000 Cao et al. .................... 359/132
6,198,757 B1 * 3/2001 Broutin et al. ................ 372/32
6,243,403 B1 * 6/2001 Broutin et al. ................ 372/32
6,291,813 B1 * 9/2001 Ackerman et al. ...... 250/214 R
6,384,947 B1 * 5/2002 Ackerman et al. .......... 359/187
6,389,046 B1 * 5/2002 Stayt, Jr. et al. .............. 372/29
6,400,737 B1 * 6/2002 Broutin et al. ................ 372/20
6,400,739 B1 * 6/2002 Auracher .................... 3723/32

* cited by examiner

Primary Examiner—Leslie Pascal
Assistant Examiner—Hanh Phan
(74) Attorney, Agent, or Firm—Cohen, Pontani, Lieberman & Pavane

(57) ABSTRACT

A circuit for increasing the signal-to-noise ratio in an optical communication system and for stabilizing a laser wavelength. The circuit includes an impedance element disposed in parallel relation with the input capacitance of the circuit to increase the input capacitance for filtering out noise in the circuit to thereby achieve a high signal-to-noise ratio. The bandwidth of the noise signal is kept low to achieve high signal-to-noise ratios and efficient wavelength stabilization. By operating at low bandwidths, the input capacitance of the circuit does not dominate the shunt voltage and associated current due to the noise; rather, a feedback resistance associated with an operational amplifier dominates the magnitude of the noise current. Thus, the input capacitance can be increased without increasing noise current, which effectively filters the noise from the total current in the circuit and advantageously insures that the bandwidth of the noise is low and the signal-to-noise ratio of the circuit remains high.

19 Claims, 2 Drawing Sheets

CIRCUITS AND METHODS FOR ACHIEVING HIGH SIGNAL-TO-NOISE RATIOS AND OBTAINING STABILIZED LASER SIGNALS IN DENSE WAVELENGTH DIVISION MULTIPLEXING SYSTEMS

BACKGROUND OF THE INVENTION

1. Field of the Invention

The present invention relates generally to circuits for effecting wavelength stabilization in optical communication systems that include lasers for producing optical signals carrying data and noise. More specifically, the invention relates to circuits and methods for increasing the signal-to-noise ratio in optical communication systems to stabilize laser wavelengths in the system.

2. Description of the Related Art

Lasers are commonly used in optical communication systems for multiplexing data channels. In such systems, multiple lasers produce signals having different but very close frequencies so that multiple channels of data can be transmitted by the system. The achievement of wavelength or frequency stabilization of the lasers has been an inherent problem in such systems, and has taken on greater importance for both wavelength division multiplexed (WDM) and dense wavelength division multiplexed (DWDM) optical communication systems as the need to increase the number of channels has proliferated. DWDM systems in particular experience stabilization problems since the spacing of channels is reduced to 100 GHz or less to achieve greater system capacity. Moreover, it is necessary to realize high signal-to-noise ratios in order to effectively achieve frequency stabilization in optical communication systems.

In a stabilized optical communication system, wavelength or frequency drift can nevertheless be unintentionally and undesirably introduced by the aging and/or temperature dependence of the laser itself, and/or by the stabilization electronics. The wavelength of a laser in such an optical communication system is typically controlled by temperature. Thus a thermoelectric cooler (TEC) is placed in thermal contact with the laser to control the laser's temperature via a feedback current. The temperature of the TEC is varied based on the level of the feedback current to thereby change the temperature of the laser. In theory, this feedback loop stabilizes the laser's wavelength. Still, drift is rampant in such systems and causes system performance to degrade. One proposed solution is to split the laser light into two paths, at least one of which passes through an optical filter; the second path defines a power reference that is used for optical power normalization. This approach is taught and disclosed in commonly owned copending U.S. patent application Ser. No. 09/265,291, filed Mar. 9, 1999, the teachings of which are incorporated herein by reference. After normalization, a signal is obtained that is essentially a function of only wavelength and is therefore used to stabilize the laser. Another approach is to add a modulation circuit in each of the paths after the control signal is detected to produce a modulated control signal for use in stabilization. This approach is taught and disclosed in commonly owned copending U.S. patent application Ser. No. 09/140, 050, filed Aug. 26, 1998, the teachings of which are incorporated herein by reference.

While the two path approach lends itself well to optical systems, because the overall aging factors of all of the components, especially the electronics, in the system are unknown it is anticipated that it may be difficult to obtain correct optical power normalization. This deficiency requires the additional introduction of autozeroing and other reduction techniques to the system, which are both time consuming and costly. A solution of this nature is taught and disclosed in commonly owned U.S. patent application Ser. No. 09/265,338, filed Mar. 9, 1999 the teachings of which are incorporated herein by reference. Additionally, the two path approach requires two stable paths for the channels or that a stable multiplexer be provided to a microcontroller which implements the feedback path to control the laser. Furthermore, adding modulators in each of the paths may be uneconomical and inefficient since it simply adds additional components that themselves contribute to the overall aging problems associated with the circuit in the first instance.

Moreover, it is particularly important in DWDM systems that, after detection of the optical signals and amplification, a high signal-to-noise ratio be achieved in order to ensure that adequate wavelength stabilization will be attained. In the past, a high signal-to-noise ratio has been obtained by reducing the input capacitance which appears at the front end of an amplifier that amplifies the electrical signal output from a detector which converts the optical signal to a usable analog electrical signal containing representations of the data and noise components found in the system. However, this approach has typically been applied in wide bandwidth applications where the capacitance term can dominate the noise contained on the communication signals. For wavelength stabilization, a low bandwidth portion of the spectrum may be used. The inventors herein have recognized that contrary to the usual wide bandwidth case, decreasing input capacitance will actually contribute to the noise current and create deleterious effects on the system when wavelength stabilization is desired, since less filtering is achieved.

Accordingly, there is a long-felt, but unresolved, need in the art for systems for stabilizing the wavelength of laser controlled elements of optical communication systems. The systems should be cost efficient and easily implemented in existing systems. It would be desirable if such systems did not introduce high-cost or additional hardware elements to the circuits that implement the systems in order to save costs and to preserve the precious physical space of already densely packed optical communication systems. Such needs have not heretofore been met in the optical communications art.

SUMMARY OF THE INVENTION

The aforementioned problems are solved, and long felt needs met, by circuits and methods of the present invention for stabilizing a wavelength of an optical signal carrying noise and data components in an optical communication system. The inventive circuits achieve wavelength stabilization by increasing the signal-to-noise ratio of a control signal obtained by conversion from the optical signal, wherein the electrical signal includes electrical representations of the noise and wavelength of the optical signal. The circuits include a receiver for receiving the electrical signal and amplifying the electrical signal so that the amplified electrical signal can be used in a feedback loop to create a wavelength-stabilized electrical control signal that controls the output wavelength of the laser. A feedback resistor is connected to an output node of the receiver and controls a gain of the receiver. An impedance element is coupled to an input node of the receiver and modifies the characteristic impedance of the circuit, thereby filtering noise from the electrical signal and increasing the signal-to-noise ratio at the input node of the receiver so that the receiver outputs the amplified electrical signal which is used to create the electrical control signal for wavelength stabilization.

In a preferred embodiment, the noise signal is a current whose magnitude is dependent on input capacitance at wide bandwidth. But at low bandwidths, decreasing the bandwidth will increase the signal-to-noise ratio by reducing the noise current. In a further preferred aspect of the invention, the impedance element used to reduce the noise bandwidth is a capacitor.

The circuits of the present invention ensure that high signal-to-noise ratios are achieved so that wavelengths in optical communication systems in which the circuits are employed can be easily and efficiently stabilized. The inventors of the circuits and methods disclosed and claimed herein have recognized that, in contrast with high bandwidth applications, the total noise current in low bandwidth systems can be reduced by the addition of capacitance which reduces the bandwidth. This increases the signal-to-noise ratio of the system, thereby effectively achieving improved wavelength stabilization of the laser. Such results have not heretofore been achieved in the art.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the views.

DETAILED DESCRIPTION OF THE PRESENTLY PREFERRED EMBODIMENTS

Figure 1:
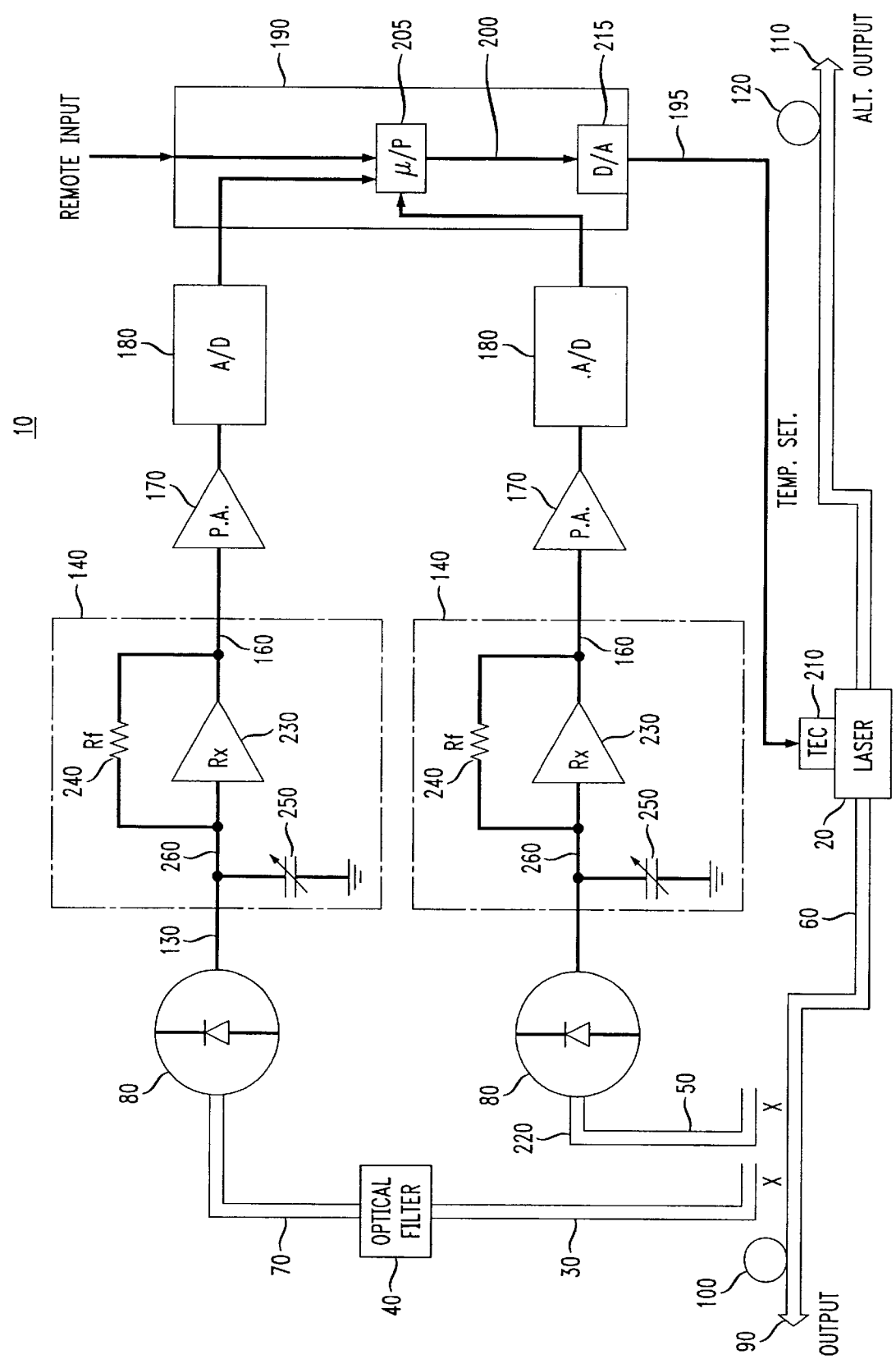
FIG. 1 is a block diagram of a circuit for stabilizing a laser's wavelength and outputting a control signal to control the laser's output power in accordance with the present invention.

FIG. 1 depicts, by way of preferred and illustrative example, a block diagram of a circuit 10 for stabilizing the wavelength and controlling a laser 20 in an optical communication system. It will be recognized that when multiple channels are desired, multiple circuits 10 will be utilized, each of which includes a laser 10 that outputs an optical signal having slightly different wavelengths and frequencies than those of its neighbors. In this fashion, a multiplexed system of channels may be built and a WDM or DWDM system can be implemented. For illustrative purposes here, a single circuit 10 is shown and described wherein wavelength stabilization is achieved in accordance with the invention.

Circuit 10 is preferably of the dual-path type to implement a feedback loop for controlling laser 20 whose output signal 60 is split between first and second paths 30, 50. A first path 30 is input to an optical filter 40 that produces a filtered optical signal to define what will become a control signal for controlling the output of laser 20. Second path 50 defines a reference path for the feedback loop of circuit 10. Path 50 may be used to normalize the output from path 30 depending on the particular requirements of the optical communication system in which circuit 10 is placed. While a two path system has been depicted in FIG. 1, it will be recognized by those skilled in the art that a single path system may also employ the circuits and methods of the present invention, and that a three or more path system may likewise implement and employ the inventive aspects disclosed and claimed herein.

Laser 20 outputs the optical signal 60 which is input to optical filter 40 that is operable to provide an optically filtered signal 70 which, after further processing, becomes a control signal for use in a feedback loop to control the output wavelength of laser 20. The output of optical filter 40 is in optical communication with a detector 80 that is operable to receive the optically filtered signal 70 from filter 40 and to convert this signal to an electrical signal which carries the noise components found in signal 60. Laser 20 advantageously includes two outputs, a primary output 90 in optical communication with a first optical fiber 100 for conventionally bussing optical signals controlled by circuit 10 to the communication system, and an alternate output 110 in optical communication with a second fiber 120 for conventionally bussing these optical signals to other parts of the communication system.

Optical filter 40 may be a Fabry-Perot, etalon, optical coating or other kind or construction of filter that is adapted to perform the filtering task as required for the particular optical communication system in which circuit 10 is utilized and which is used now, or may be developed in the future, to provide the tuning and filtering functions for path 30 in circuit 10. Detector 80 may be any known detector operable to convert an optical or light signal to an electrical signal. Such detectors fall in the class of avalanche photodiodes (APDs) and PIN photodetectors that are readily known to those skilled in the art. Yet other detectors may be employed in circuits of the present invention such as optical random access memories (OpticRAMs) and semiconductor pixel arrays, depending on the desired application and the complexity of the components found in or carried by optical signal 60. All such detectors and equivalents thereof are intended to be within the scope of the inventive circuits and methods. In the currently preferred embodiment, detector 80 is a PIN photodiode. Photodiode 80 outputs an analog electrical signal 130 which contains electrical representations of the signal and noise components found in optical outputs 30, 60.

Photodiode 80 is in electrical communication with an input network 140 that is operable to maximize the signal-to-noise ratio of the electrical analog signal in accordance with the present invention. The signal output from output node 160 of network 140 is received by a post-amplification circuit 170 that conditions the signal for further processing by the remaining elements of circuit 10 so as to produce a control signal for adjusting the output wavelength of laser 20. Conventionally, post-amplifier 170 is an operational amplifier that further amplifies the signal, although any suitable type of amplifier may be used to achieve the desired level of amplification.

A digitizer 180 receives the signal output from post-amplifier 170 to convert the filtered analog signal to a digitized version containing digital representations of the signals 70, 130. Digitizer 180 may be implemented by any circuit that converts analog signals to digital signals, and is preferably a conventional analog-to-digital (A/D) converter. In a preferred form of circuit 10, A/D converter 180 is directly connected to a microcontroller 190 that is operable to receive the digital signal from A/D converter 180 and which implements a feedback loop 195 with a remote control digital signal 200 to an external control device 210 by way of a digital-to-analog (D/A) converter. Those skilled in the art will appreciate that remote control digital signal 200 may be input to device 210 such as a TEC which is further interfaced to laser 20 to provide an external stimulus to laser 20 in order to control the output wavelength of laser 20 as discussed above. The TEC is conventionally used to control the operating temperature of laser 20 to control the output wavelength of laser 20. However, other remote control devices are readily available and can be implemented in the feedback loop 195 of circuit 10 so long as they can be coupled to laser 20 to control the output wavelength therefrom. Such devices may include, without limitation, pressure cells, capacitance probes, magnetic flux devices, and digital controllers, all of which are currently available devices known to those skilled in the art.

It will be further appreciated that microcontroller 190 may be any digital device that can implement a feedback loop with laser 20 as described above. Thus, microcontroller 190 may include a microprocessor and conventional memory units, or may be a digital microcontroller with appropriate software. In the preferred and herein-disclosed embodiment of inventive circuit 10, microcontroller 190 includes a digital central processing unit 205 that receives signals from A/D converter 180 to implement the feedback loop 195 to control and stabilize the wavelength of laser 20. Preferably, a digital control signal produced by microprocessor 205 is input to a digital-to-analog (D/A) converter 215 so that an analog signal can be input to TEC 210 to control laser 20. The A/D converter 180 and D/A converter 215 may be integrated as part of the microcontroller 190 or may be separate or even discrete components.

The secondary path 50 also includes a photodetector 80, input network 140, post-amplifier 170 and A/D converter 180, all of which function as described with respect to the primary path 30. However, secondary path 50 does not include an optical filter 40 and accordingly does not produce an optically filtered signal. Secondary path 50 instead produces a reference signal 220 that is converted to an electrical analog signal by photodetector 80 in secondary path 50 and which is then operated on by the elements in the secondary path to produce a digital signal that is input to microcontroller 190 and microprocessor 205 for use in controlling laser 20 in conjunction with the control signal created by primary path 30.

Input network 140 is provided to ensure that the signal-to-noise ratio of controller 190 is kept sufficiently high so that wavelength stabilization can meet objectives. It will be recognized by those skilled in the art that circuit 10 produces a characteristic input capacitance $C_{in}$ that input network 140 sees at its front end or input node. Moreover, the noise component of the analog electrical signals in circuit 10 produces an equivalent electrical signal, i.e. a voltage or current, that influences the signal-to-noise ratio internal to circuit 10 and which should be minimized to ensure that the signal-to-noise ratio internal to circuit 10 is high so as to allow the wavelength of laser 20 to be stabilized to the objectives of the system.

To accomplish this goal, input network 140 includes a receiver (Rx) 230 that conditions the signal 130 received from photodiode 80. Receiver 230 is preferably an amplifier for amplifying signal 130, and even more preferably, is an operational amplifier having a gain A. A feedback resistor 240 having a feedback resistance value $R_f$ is connected to the output node 160 of Rx 230 to stabilize network 140 and, as described in detail below, to control the magnitude of the electrical signal produced by the noise in circuit 10. A capacitor 250 is preferably disposed in parallel with the input node 260 of input network 140 and, also as described in more detail below, will have a capacitance value that controls the magnitude of the noise signal produced by the noise in circuit 10 under certain circumstances. While capacitor 250 has been shown in circuit 10 to control the noise signal magnitude, it will be appreciated that the capacitance value actually creates an impedance that controls the noise signal, typically a current, in circuit 10. To fully gain control of the magnitude of this current, capacitor 250 may be a variable capacitor that is adjustable to achieve the desired level of additional capacitance, i.e. impedance, to control the current. Moreover, those skilled in the art will recognize that any kind of impedance element such as a coil, a coil in combination with a capacitor, or a coil-resistor-capacitor combination, may replace capacitor 250 to obtain the desired level of impedance to control the magnitude of the noise current. Such alternative combinations may also be variable to adjustably achieve the desired level of impedance at the input node 260.

Figure 2:
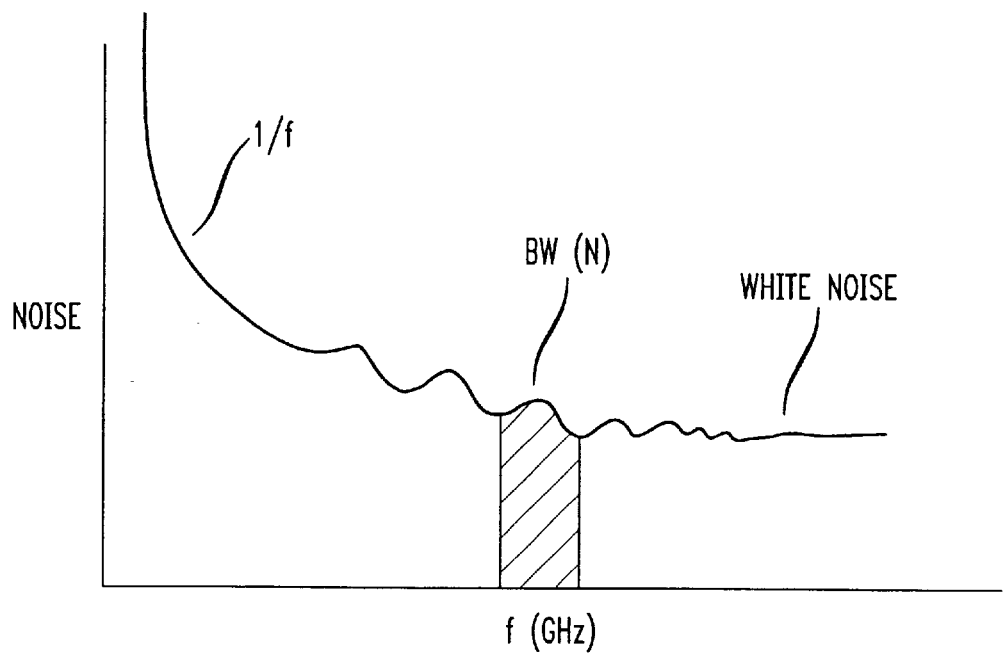
FIG. 2 is a graph depicting the noise spectrum in the circuit of FIG. 1.

Wavelength stabilization requires a high signal-to-noise ratio. This may be accomplished by utilizing a low bandwidth, i.e. narrow bandwidth, which is a narrow slice of the noise spectrum. Low bandwidths will generally produce high signal-to-noise ratios. FIG. 2 depicts the noise curve as a function of frequency (f) for an optical transmission system in which circuit 10 may for example be employed. As seen, the noise generally falls off with 1/f for increasing frequency.

Lower noise has the added benefit of allowing a lower range setting of A/D converter 180 without clipping, which yields a higher A/D converter signal-to-noise ratio without an increase in the number of bits in the A/D converter. These results have not heretofore been achieved in the art. It will be recognized by those skilled in the art that the terms "low" bandwidth and "high" bandwidth are relative terms and will depend on the particular nature of the system in which circuit 10 is employed. For example, in a WDM system a low bandwidth will be substantially wider than a low bandwidth in a DWDM system since the channel spacing in a DWDM system is much narrower than in a WDM system, and so that wavelengths in a WDM system do not need to be stabilized to such close values as must be achieved in a DWDM system. Therefore, the term low bandwidth may have different ranges depending on the types of systems in which the wavelength must be stabilized. As used herein and particularly in DWDM systems, the term "low" bandwidth generally means a bandwidth of less than about 10,000 Hz and more preferably less than about 1000 Hz. All values above 10,000 Hz are considered "high" or "wide" bandwidths. In any event, the inventive circuits can be utilized in any system having low bandwidth as the additional capacitance 250 can be sized accordingly to achieve high signal-to-noise ratios. These same general considerations concerning bandwidths as discussed immediately above apply to the signal-to-noise ratios, so that the particular desired levels of signal-to-noise ratio will depend on the particular characteristics and needs of the optical system in which circuit 10 is or will be employed. In still furthered preferred aspects of the inventive circuits, the signal-to-noise ratio of the electrical signal output by Rx 230 is greater than about 20 dB, and even more preferably greater than about 40 dB.

Normally, $C_{in}$ at the front end node 260 of input network 140 is minimized in order to increase the sensitivity of network 140. An increase in $C_{in}$ tends to lower the signalto-noise ratio of the circuit, an effect that those skilled in the art will recognize as deleterious to wavelength stabilization which requires high signal-to-noise ratios. The inventors have discovered that for low bandwidth applications such as wavelength stabilization the $C_{in}$ term does not dominate the noise signal so that $C_{in}$ may actually be modified, and even increased, to achieve laudable effects in circuit 10.

Figure 3:
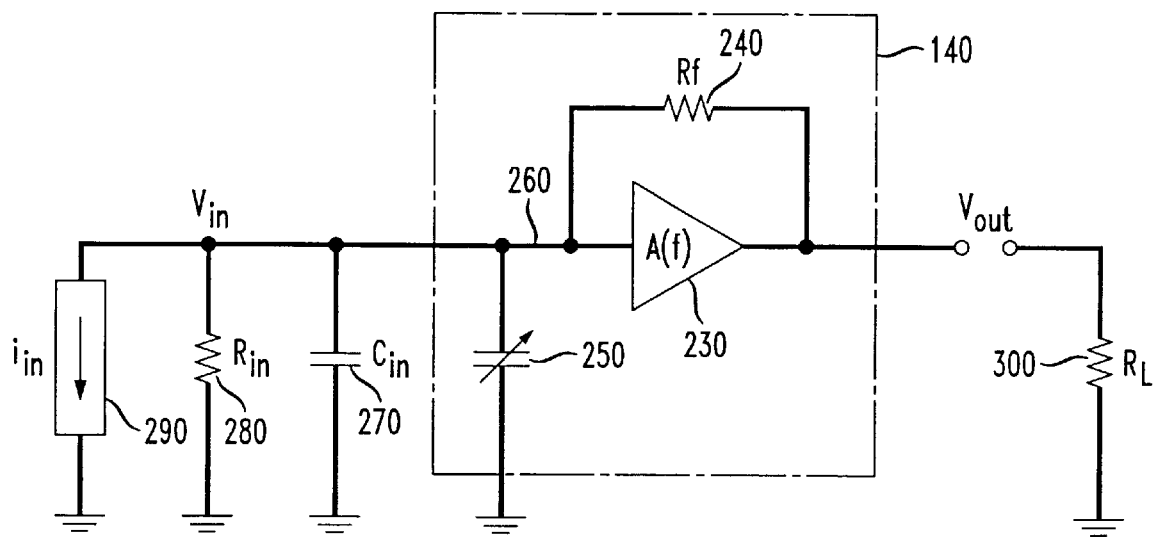
FIG. 3 is a schematic of an input network for maximizing the signal-to-noise ratio of the circuit of FIG. 1.

Referring therefore to FIG. 3, an equivalent circuit is depicted for circuit 10 which allows characterization of the noise signals such that a low bandwidth for circuit 10 is maintained and high signal-to-noise ratios are achieved. Input network 140 is coupled at its front end node 260 with the equivalent $C_{in}$, the total input capacitance of the circuit elements. Similarly, $R_{in}$ 280 is the equivalent input resistance of circuit 10 with the effects of $C_{in}$ and $R_f$ excluded. The $i_{in}$ term 290 is the current produced from photodiode 80 which is a combination of signal current $i_{insignal}$, and noise current $i_{innoise}$. $R_L$ 300 is the load resistance, i.e. the resistance of all of the circuit elements presented to the output of network 140.

The noise signal from element 230 can be modeled as a shunt voltage $V_A$ of the operational amplifier 230 with $V_A$ taken from the published data sheet for operational amplifier 230. A simple application of Kirchoff's law to the equivalent circuit of FIG. 3 produces the following equation for $i_{innoise}$:

$$i^2_{innoise} = V^2_A \{(A/R_f + 1/R_f + 1/R_{in})^2 BW^{0.3}/0.3 + (2\pi C_{in})^2 BW^{2.3}/2.3\},$$

where $R_f$ is $10^5$ ohms, A is about $10^4$ and $R_L$ is about 2 koh

From the above equation, at large bandwidths the $C_{in}$ term dominates the magnitude of the noise current, while at lower bandwidths the $A/R_f$ term dominates. Therefore, since $A/R_f$ is the dominant term at low bandwidths, which is the case in wavelength stabilization in accordance with the present invention, contrary to the usual practice, at low bandwidths additional capacitance 250 can be added to the front end node 260 to further reduce the noise. Capacitor 250 may be variable and therefore selectively changeable to achieve the desired additional capacitance for circuit 10 to control bandwidth and the signal-to-noise ratio of the circuit. Additionally, other impedance elements (as mentioned above) can be substituted for capacitor 250 to change the total input impedance of circuit if it is more convenient to characterize these values in other than pure capacitance terms.

By adding the additional capacitance as described above, a simple and effective way of increasing the signal-to-noise ratio is achieved. Adding this additional capacitance reduces the noise component of the electrical signals. Thus in accordance with the present invention, and contrary to prior art practices, adding capacitance 250 actually improves the signal-to-noise ratio in low bandwidth situations and provides efficient wavelength stabilization of the output signal of laser 20. This is accomplished simply and without the addition of expensive components in circuit 10. Such advantageous results have not heretofore been achieved in the art.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A circuit in an optical communication system that includes a laser which produces an optical signal, for stabilizing a wavelength of the optical signal by increasing a signal-to-noise ratio of the circuit and for outputting a wavelength-stabilized electrical control signal, for use in controlling the laser, wherein the circuit has a characteristic input capacitance produced by circuit elements in the system and that defines a characteristic impedance for the system at an electrical input node of the circuit, and wherein the optical signal is converted to an electrical signal having an electrical representation of the noise and wavelength of the optical signal, comprising:

a receiver having a gain, an input node for receiving the electrical signal and an output node and operable for amplifying the received electrical signal and for outputting the amplified electrical signal at the output node for use in a feedback loop to create the electrical control signal for optical wavelength stabilization;

a feedback resistor coupled between the input node and the output node of the receiver for controlling the gain of the receiver; and an impedance element coupled to the input node of the receiver for modifying the input impedance of the system and having an impedance value selected for filtering noise from the electrical signal and increasing the signal-to-noise ratio at the input node of the receiver so that the amplified electrical signal output by the receiver has a high signal-to-noise ratio for use in creating the control signal for optical wavelength stabilization.

2. The circuit of claim 1, wherein said receiver comprises an operational amplifier.

3. The circuit of claim 2, wherein said impedance element comprises a capacitor having a capacitance selected to produce, in combination with the characteristic input capacitance, a total capacitance effective to reduce the noise from the electrical signal without contributing to the noise and without reducing the signal-to-noise ratio of the circuit.

4. The circuit of claim 3, wherein said capacitor comprises a variable capacitor.

5. The circuit of claim 4, wherein the noise is defined by a current having a magnitude that is controlled by the feedback resistor.

6. The circuit of claim 5, wherein the noise has a bandwidth less than about 10,000 Hz.

7. The circuit of claim 6, wherein the bandwidth of the noise is less than about 1000 Hz.

8. The circuit of claim 7, wherein the increased signal-to-noise ratio is greater than about 20 dB.

9. The circuit of claim 8, wherein the increased signal-to-noise ratio is greater than about 40 dB.

10. A circuit for controlling output of a laser in an optical system by stabilizing a wavelength of the laser, wherein the laser produces an optical signal having noise, and wherein the circuit has a characteristic input capacitance and a characteristic input resistance produced by elements in the circuit, comprising:

a detector for detecting the optical signal and for converting the optical signal to an electrical signal having analog electrical representations of the noise and wavelength of the optical signal;

an input network having an input node coupled to the detector for receiving the electrical signal from the detector and operable for producing an electrical signal for use in a feedback loop implemented by the circuit for creating an electrical control signal for controlling the output wavelength of the laser, wherein the input network further comprises a capacitor coupled to the input node and having a capacitance value selected for filtering noise from the received electrical signal and increasing a signal-to-noise ratio of the circuit to thereby stabilize the wavelength; and a microcontroller connected to the input network for receiving the electrical signal and for implementing the feedback loop for creating the wavelength-stabilized electrical control signal to the laser.

11. The circuit of claim 10, wherein said input network further comprises:

a receiver having a gain, a receiver input node for receiving the electrical signal and an output node and operable for amplifying the received electrical signal and for outputting the amplified electrical signal at the output node for use in the feedback loop to create the electrical control signal; and a feedback resistor coupled between the receiver input node and the output node of the receiver for controlling the gain of the receiver.

12. The circuit of claim 11, wherein said receiver comprises an operational amplifier.

13. The circuit of claim 12, wherein the capacitor comprises a variable capacitor.

14. The circuit of claim 13, wherein the noise is defined by a current having a magnitude that is controlled by the feedback resistor.

15. The circuit of claim 14, wherein the noise has a bandwidth of less than about 10,000 Hz.

16. The circuit of claim 15, wherein the bandwidth of the noise is less than about 1000 Hz.

17. The circuit of claim 16, wherein the increased signal-to-noise ratio is greater than about 20 dB.

18. The circuit of claim 17, wherein the increased signal-to-noise ratio is greater than about 40 dB.

19. A method of stabilizing a wavelength of an optical signal carrying data and noise in a circuit of an optical communication system that includes a laser for producing the optical signal, wherein the optical signal is converted to an electrical signal comprising an electrical representation of the noise and wavelength of the optical signal, wherein the circuit produces from the electrical signal an electrical control signal for controlling an output wavelength of the laser and has a characteristic input capacitance produced by circuit elements in the circuit, wherein the noise has a low bandwidth, and wherein improved stabilization is achieved by increasing a signal-to-noise ratio of the circuit, said method comprising the step of:

adding selected impedance at an input node of the circuit to thereby filter the noise from the electrical signal and increase the signal-to-noise ratio of the circuit produced from the electrical signal to produce a wavelength-stabilized electrical control signal.

* * * * *